Jan. 2, 1951      J. C. WIDMAN      2,536,863
WINDCORD ASSEMBLY

Filed Sept. 12, 1946      2 Sheets-Sheet 1

J. C. WIDMAN
INVENTOR.

BY E. C. McRae
R. G. Harris
J. R. Faulkner
T. H. Oster
ATTORNEYS

Patented Jan. 2, 1951

2,536,863

UNITED STATES PATENT OFFICE 2,536,863

WINDCORD ASSEMBLY

John C. Widman, Royal Oak, Mich., assignor to Ford Motor Company, Dearborn, Mich., a corporation of Delaware Application September 12, 1946, Serial No. 696,442

1 Claim. (Cl. 20—69)

This invention relates generally to vehicle body construction, and has particular reference to a windcord assembly for motor vehicle bodies.

It is customary in modern vehicle body construction to provide a windcord adjacent the marginal edges of each door opening at the interior of the vehicle body to provide a wind seal closing the inner end of the clearance space provided between the jamb faces of the door and the adjacent faces of the pillars and roof rail of the body. The windcord usually consists of a soft rubber strip of circular cross section contained within a close fitting fabric cover, the edges of which are stitched together and extend outwardly a short distance from the rubber strip to form a marginal attaching portion which is secured to the vehicle body. Various types of fastening means are used to mount the fabric attaching portion of the windcord to the door pillars and roof rails, including metal tongues struck out from the sheet metal forming the door pillars and roof rails and then crimped over the fabric at spaced intervals. In some instances the fabric is tacked to a suitable tacking strip secured to the pillar or rail. Inasmuch as the marginal fabric portion is unfinished and unsightly, as also are the fastening elements used, the roof headliner and suitable trim panels mounted upon the door pillars are arranged to overlap the extending fabric portion of the windcord. It will readily be seen that the conventional construction is subject to several disadvantages. Not only is the assembly of the windcord to the body consuming of time and labor and thus expensive, but inasmuch as the windcord is attached only at spaced intervals, a continuous support is not provided. In addition, greater pains must be taken with the assembly of the headliner to insure properly covering the marginal fabric portion of the windcord, and additional trim material must be provided upon the door pillars together with suitable fastening means therefor.

It is therefore a primary object of the present invention to provide a windcord assembly which may be readily mounted upon the interior of a vehicle body with a minimum of time and labor. The invention eliminates the necessity of tacking or fastening the windcord to the body at closed spaced intervals since the windcord is continuously and firmly supported in a rolled metal molding which in turn is mounted upon the body by spring fasteners which may be spaced at relatively wide intervals. The entire assembly can thus be quickly snapped into place and effects a considerable saving in labor cost.

An additional object of the invention is to provide a windcord assembly which presents an attractive appearance when viewed from the interior of a vehicle body and which does not have exposed unfinished parts which must be covered by separate trim material. The rolled metal molding forms the mounting means for the windcord and completely covers the marginal fabric portion of the windcord as well as the fastening elements used to secure the assembly to the body. The molding may be attractively styled and provided with either a plated or enameled finish designed to harmonize with the interior of the body and to thus provide a pleasing appearance. Thus it is not necessary to provide additional trim material to cover the unfinished portions of the windcord and the trim strips on the door pillars can be eliminated entirely, effecting a further saving in labor and material costs without detracting from the appearance of the vehicle. At the roof rail the headliner material can be readily fastened to the headliner retainer without interference from the windcord since the latter is assembled later in such a position as to cover the lower edge of the headliner.

Other objects and advantages of the present invention will be made more apparent as this description proceeds, particularly when considered in connection with the accompanying drawings, wherein.

Figure 1:
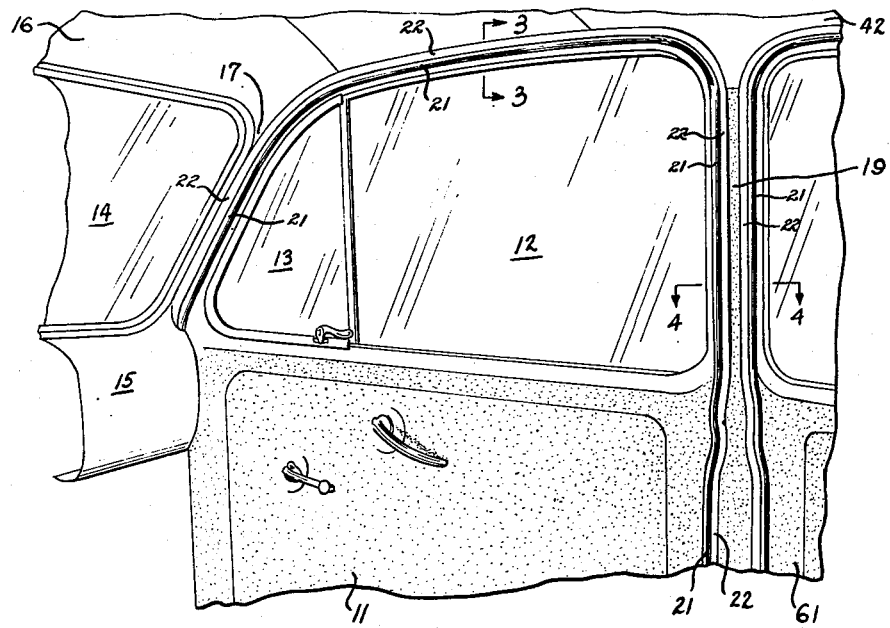
Figure 1 is a fragmentary perspective view of a portion of the interior of a motor vehicle body, as seen when viewed from the interior of the vehicle looking toward the right front hinge pillar.
Figure 3:
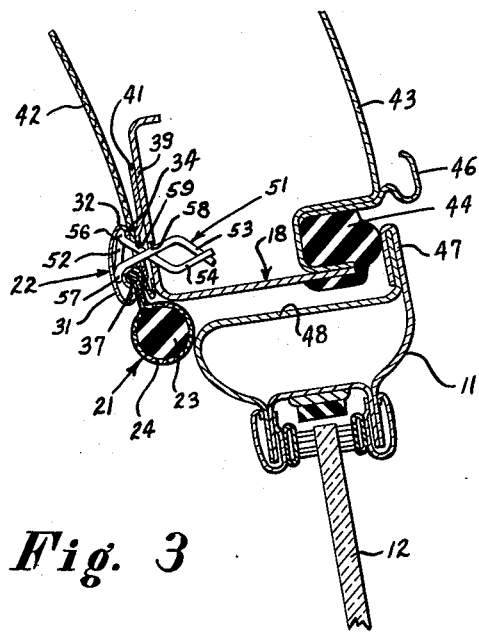
Figure 4:
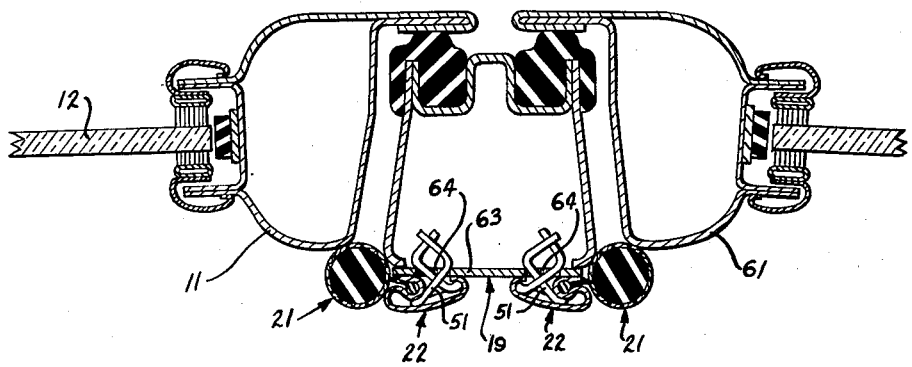

Figures 3 and 4 are cross-sectional views taken substantially on the planes indicated by the lines 3—3 and 4—4 of Figure 1.

Figures 2, 5:
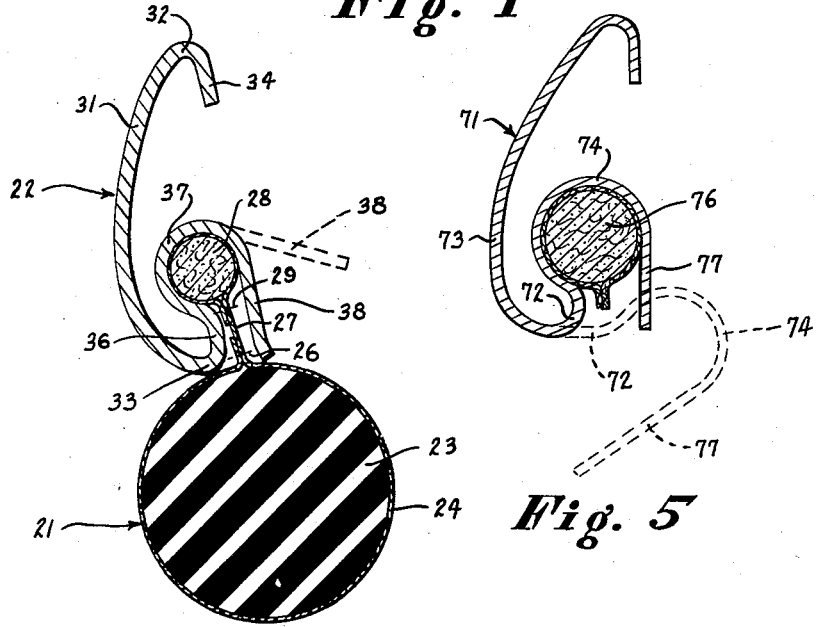
Figure 2 is an enlarged cross-sectional view through the windcord assembly.

Figure 5 is a fragmentary cross-sectional view through a modified windcord assembly.

Referring now more particularly to the drawings, there is shown a portion of a conventional vehicle body including the right front door 11, a vertically slideable window 12 in the upper portion of the door, a ventilating window 13 pivotally mounted in the door, a windshield 14, an instrument panel 15 and a roof 16. The marginal edges of the door opening in the body are bounded by front body hinge pillar 17, a roof rail 18 and a door pillar 19.

A windcord assembly comprising the windcord 21 and a molding 22 extends continuously around the sides and top of the door opening, being secured to the hinge pillar 17, roof rail 18 and door pillar 19 in a manner to be more fully described hereinafter. With particular reference to Figure 2, it will be noted that the windcord 21 comprises a soft rubber strip 23 of circular cross section contained within a closely fitting fabric cover 24 stitched in place at 26. One edge of the fabric cover 24 extends outwardly to form a web 27 and then encircles a core 28 of circular cross section formed of any suitable material such as cord or compressed or rolled paper. The marginal edge of the fabric cover 24 is then secured to the web 27 by stitching at 29.

The molding 22 is of rolled metal construction and comprises a curved body portion 31 which is formed with a rolled outer edge 32 and a rolled inner edge 33. The molding is bent inwardly beyond the outer edge 32 to form a flat marginal flange 34. Beyond the rolled inner edge 33 the molding is bent outwardly to form a flat intermediate portion 36 which merges into a grooved portion 37 of semi-circular cross section and then into a flat marginal flange 38. The marginal flange 38 initially extends outwardly as shown by the dotted lines in Figure 2, to provide sufficient clearance for the insertion of the core 28 of the windcord into the groove 37, after which the marginal flange 38 is rolled or bent inwardly to the position shown in full lines. In the latter position it will be noted that the core 28 is effectively retained in the groove 37 and cannot be displaced therefrom. It will also be apparent that this construction provides a continuous support for the windcord and serves to secure the latter firmly to the molding throughout its length. Additional rigidity against displacement of the windcord when in use is provided by making the web 27 of such length that the windcord 21 fits against the rolled inner edge of the molding and against the outer edge of the flange 38 of the molding.

When closed, the flange 38 of the molding lies in the plane of the outer flange 34 to provide a flat back for the molding enabling it to be seated against a door pillar or other body member.

Figures 3 and 4 illustrate the manner of attachment of the windcord assembly to the roof rail 18 and the door pillar 19 respectively. Referring now to Figure 3 it will be seen that the roof rail 18 has an upwardly extending inner flange 39 which supports a headliner retainer 41, the latter being suitably spot welded thereto. The lower edge of the headliner retainer is serrated to provide means for fastening the lower portion of the headliner material 42 to the roof rail. Adjacent its outer edge, the roof rail 18 is spot welded to the lower flange of the roof panel 43. A rubber sealing strip 44 is mounted upon the roof rail beneath the drip molding 46 and engages the marginal flange 47 of the frame of the door 11 to provide a seal between the outer portions of the roof rail and the door.

It will be noted that a considerable space or clearance is provided between the jamb face 48 of the door and the adjacent face of the roof rail 18 to compensate for manufacturing variations and distortion during assembly and operation of the vehicle. It is the inner edge of this opening which the windcord assembly is designed to close.

For mounting the windcord assembly upon the roof rail 18 a plurality of spaced spring fasteners 51 are provided. Each fastener is formed from a piece of spring wire bent upon itself to form a T head 52 and narrow legs 53 and 54. The legs are bent to form, in conjunction, a diamond shaped spring structure terminating in crossed end portions. The T shaped head 51 of each spring fastener is inserted into the molding 22 from the back thereof and is then turned 90° to the position shown in Figures 3 and 4 in which the upper edge 56 of the head is retained adjacent the rolled outer edge 32 of the molding by the flange 34 and the lower edge 57 is retained between the body portion 31 and the grooved portion 37 of the molding. Holes 58 and 59 are formed in alignment with each other in the inner flange 39 of the roof rail and in the headliner retainer 41 respectively, and are large enough to receive the crossed free ends of the legs 53 and 54 of the spring fastener, but are smaller than the normal span of the diamond shaped spring structure formed by the legs. A suitable aperture is also formed in the headliner material 42 to permit the insertion of the legs of the spring fastener therethrough.

To assemble the molding and the attached windcord to the flange 39 of the roof rail, it is only necessary to align the fasteners 51 with the holes 58 and 59 and to force the molding toward the flange. This compresses the diamond shaped spring structure until its maximum span passes through the holes, and thereafter the spring re-expands and pulls the molding 22 inwardly into contact with the headliner 42 and the headliner retainer 41, in which position it is automatically secured.

In Figure 4 a door pillar 19 between the front and rear doors 11 and 61 of the vehicle body is provided with an inner plate 63 formed with two rows of spaced holes 64 for the insertion of the spring fasteners 51 of the molding 22. The pillar thus provides a support for a pair of windcord assemblies, one assembly being provided adjacent each door.

From the foregoing description it will be apparent that this construction achieves the advantageous results enumerated above. Assembly of the windcord 21 to the molding 22 is extremely simple, since it is only necessary to insert the core 28 of the windcord into the groove 37 of the molding and then to roll or bend the marginal flange 38 into its final position. The resulting assembly can then be installed as a unit upon the vehicle body during final assembly of the latter. This operation is also accomplished with a minimum of time and labor since the spring fasteners 51 can be quickly snapped into place. Due to the inherent rigidity of the molding 22, the spring fasteners 51 can be spaced at relatively wide intervals, yet at the same time the windcord will be continuously supported along its entire length since it is held within the groove 37 of the rigid metal molding 22. The molding 22 effectively covers from view the web 27 of the fabric cover 24 of the windcord as well as the core 28 enclosed within the outer portion of the fabric cover. In addition the spring fasteners 51 are hidden by the molding 22, so that the only visible portions of the assembly are the fabric covered rubber strip of the windcord and the exterior of the metal molding. As a result the appearance of the interior of the vehicle body is enhanced.

In the modification shown in Figure 5 the molding 71 is initially formed, as shown in dotted lines, with a flat connecting portion 72 between the body portion 73 of the molding and the semi-circular portion 74. Ample clearance is thus provided for the insertion of the core 76 of the windcord into the semi-circular portion 74 of the molding, after which the connecting portion 72 is bent inwardly to the position shown in full lines. It will be noted that in this position a restricted neck is formed between the connecting portion 72 and the flat marginal flange 77 to retain the core 76 firmly in the semi-circular portion 74. This construction is particularly desirable since a relatively simple bending operation completes the assembly.

It will be understood that the invention is not to be limited to the exact construction shown and described, but that various changes and modifications may be made without departing from the spirit and scope of the invention, as defined in the appended claim.

What is claimed is:

A molding for a motor vehicle body for supporting thereon a windcord having a resilient sealing strip, an attaching rib spaced from the sealing strip, and a web interconnecting the rib and the sealing strip, comprising, a one piece rolled metal molding extending closely adjacent and parallel to said resilient sealing strip, said metal molding having a convexly curved outer shell portion extending over and concealing from view said rib and said web, the edge of said convex portion remote from said resilient sealing strip being formed with a return bend flange providing a narrow seating portion, the edge of said convex portion adjacent said resilient sealing strip being turned inwardly to form a semi-circular shaped portion adapted to receive the rib of said windcord, said molding being extended beyond said semi-circular portion to form a straight flange initially flared outwardly to provide clearance for the insertion of said rib and then bent inwardly after said rib is inserted to retain the latter in position and to permanently secure said windcord to said molding, the straight flange at one edge of said molding and the narrow return bend flange at the other edge of said molding being spaced from each other to provide clearance therebetween for the insertion of a fastening element, said flanges extending in the same direction and lying in a common plane in the completed assembly to provide spaced seating portions extending longitudinally of said molding and adapted to be seated upon a substantially planar surface.

JOHN C. WIDMAN.

REFERENCES CITED

The following references are of record in the file of this patent:

UNITED STATES PATENTS

| Number | Name | Date |
|---|---|---|
| 1,613,044 | Marshall | Jan. 4, 1927 |
| 1,729,231 | Toncray | Sept. 24, 1929 |
| 1,829,597 | Ledwinka | Oct. 27, 1931 |
| 1,836,094 | Toncray | Dec. 15, 1931 |
| 1,844,156 | Groehn | Feb. 9, 1932 |
| 1,888,729 | Leferire | Nov. 22, 1932 |
| 1,896,590 | Place | Feb. 7, 1933 |
| 2,267,433 | Tea | Dec. 23, 1941 |